United States Patent
Chun et al.

(10) Patent No.: US 9,544,107 B2
(45) Date of Patent: Jan. 10, 2017

(54) METHOD AND APPARATUS FOR ALLOCATING CONTROL CHANNEL IN WIRELESS COMMUNICATION SYSTEM

(71) Applicant: LG ELECTRONICS INC., Seoul (KR)

(72) Inventors: Jin Young Chun, Anyang-si (KR); Bin Chul Ihm, Anyang-si (KR); Ji Won Kang, Anyang-si (KR); Ki Tae Kim, Anyang-si (KR); Sung Ho Park, Anyang-si (KR); Su Nam Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/353,474

(22) PCT Filed: Oct. 26, 2012

(86) PCT No.: PCT/KR2012/008847
§ 371 (c)(1),
(2) Date: Apr. 22, 2014

(87) PCT Pub. No.: WO2013/062347
PCT Pub. Date: May 2, 2013

(65) Prior Publication Data
US 2014/0293957 A1 Oct. 2, 2014

Related U.S. Application Data

(60) Provisional application No. 61/551,902, filed on Oct. 26, 2011, provisional application No. 61/563,608, (Continued)

(51) Int. Cl.
*H04L 5/00* (2006.01)
*H04W 72/04* (2009.01)
(Continued)

(52) U.S. Cl.
CPC ........... *H04L 5/0041* (2013.01); *H04L 1/0046* (2013.01); *H04L 1/0072* (2013.01); *H04L 5/0039* (2013.01);
(Continued)

(58) Field of Classification Search
CPC .... H04L 5/0041; H04L 5/0053; H04L 1/0038; H04L 5/0039; H04L 5/0094; H04W 72/042
See application file for complete search history.

(56) References Cited

U.S. PATENT DOCUMENTS
2010/0098020 A1   4/2010   Kim et al.
2011/0170496 A1   7/2011   Fong et al.
(Continued)

FOREIGN PATENT DOCUMENTS
CN   101627595 A   1/2010
JP   2008-236434   10/2008
(Continued)

OTHER PUBLICATIONS
6.6.2.2 Samsung 6.6.2.2 Samsung Discussion on ePDCCH Design Issues 3GPP TSG-RAN1#66 meeting R1-112517, Athens, Greece, Aug. 22-26, 2011.*
(Continued)

*Primary Examiner* — Kevin C Harper
*Assistant Examiner* — Henry Baron
(74) *Attorney, Agent, or Firm* — Lee Hong Degerman Kang Waimey

(57) ABSTRACT

Provided are a method and an apparatus for allocating a control channel in a wireless communication system. A base station allocates an enhanced physical downlink control channel (e-PDCCH) to a localized region within a physical downlink shared channel (PDSCH) region, allocates the e-PDCCH to a distributed region within the PDSCH region, and transmits a scheduling assignment via the allocated e-PDCCH.

15 Claims, 17 Drawing Sheets

Related U.S. Application Data filed on Nov. 25, 2011, provisional application No. 61/577,074, filed on Dec. 18, 2011.

(51) Int. Cl.
  *H04L 1/00* (2006.01)
  *H04B 7/06* (2006.01)
(52) U.S. Cl.
  CPC .......... *H04L 5/0053* (2013.01); *H04L 5/0094* (2013.01); *H04W 72/042* (2013.01); *H04B 7/063* (2013.01); *H04B 7/0617* (2013.01); *H04B 7/0639* (2013.01); *H04B 7/0684* (2013.01); *H04L 5/0044* (2013.01)

(56) References Cited

U.S. PATENT DOCUMENTS

| | | | |
|---|---|---|---|
| 2011/0249633 A1 | 10/2011 | Hong et al. | |
| 2012/0051270 A1* | 3/2012 | Chen | H04B 7/155 370/279 |
| 2015/0139149 A1* | 5/2015 | Feng | H04L 5/0007 370/329 |

FOREIGN PATENT DOCUMENTS

| | | |
|---|---|---|
| JP | 2010-200266 | 9/2010 |
| WO | 2010/013961 | 2/2010 |
| WO | 2011/019962 | 2/2011 |
| WO | 2011/021827 | 2/2011 |
| WO | 2011/057211 | 5/2011 |
| WO | 2011/083431 | 7/2011 |
| WO | 2011/118803 | 9/2011 |
| WO | 2011/128013 | 10/2011 |
| WO | 2013/044878 | 4/2013 |

OTHER PUBLICATIONS

Agenda Item: 6.6.2.2 Samsung Discussion on ePDCCH Design Issues 3GPP TSG-RAN1#66 meeting R1-112517, Athens, Greece, Aug. 22-26, 2011.*

Intel Corporation, "Performance Analysis of the Enhanced Downlink Control Signalling," 3GPP TSG RAN WG1 Meeting #66bis, R1-113202, Oct. 2011, 5 pages.
ETRI, "Discussions on enhanced PDCCH in Rel-11," 3GPP TSG RAN WG1 Meeting #66bis, R1-113067, Oct. 2011, 4 pages.
Alcatel-Lucent, et al., "Design details for enhanced PDCCH," 3GPP TSG RAN WG1 Meeting #66bis, R1-113322, Oct. 2011, 5 pages.
Japan Patent Office Application Serial No. 2014-537007, Office Action dated May 21, 2015, 5 pages.
CATT, "Design of enhanced PDCCH in Rel-11," 3GPP TSG RAN WG1 Meeting #66, R1-112119, Aug. 2011, 4 pages.
Motorola Mobility, "Enhanced control channels for LTE Rel-11," 3GPP TSG RAN WG1 #66, R1-112446, Aug. 2011, 3 pages.
Korean Intellectual Property Office Application Serial No. 10-2014-7011379, Office Action dated May 26, 2015, 4 pages.
Japan Patent Office Application Serial No. 2014-537007, Office Action dated Oct. 23, 2015, 6 pages.
Nokia, et al., "eREG/eCCE mapping for ePDCCH," 3GPP TSG RAN WG1 Meeting #70, R1-123651, Aug. 2012, 14 pages.
Motorola Mobility, "CCE Design for EPDCCH," 3GPP TSG RAN WG1 #69, R1-122662, May 2012, 3 pages.
Nokia, et al., "Association between DM-RS ports and ePDCCH transmission," 3GPP TSG RAN WG1 Meeting #70, R1-123654, Aug. 2012, 8 pages.
Huawei, et al., "Search space design for ePDCCH," 3GPP TSG RAN WG1 Meeting #70, R1-123120, Aug. 2012, 6 pages.
Nokia, et al., "eREG/eCCE definition for ePDCCH," 3GPP TSG RAN WG1 Meeting #70, R1-123650, Aug. 2012, 6 pages.
ETRI, "Discussions on enhanced PDCCH structure," 3GPP TSG RAN WG1 Meeting #66, R1-112211, Aug. 2011, 4 pages.
European Patent Office Application Serial No. 12844062.5, Search Report dated Jun. 17, 2015, 17 pages.
Huawei et al., "Search space design for EPDCCH", 3GPP TSG RAN WG1 Meeting #70bis, R1-124078, Sep. 29, 2012, 8 pages.
Editor (Ericsson), "Inclusion of Rel-11 features", 3GPP TSG-RAN WG1 Meeting #70, R1-124010, Sep. 19, 2012, pp. 49-52, 66-67 (7 pages provided).
Research In Motion, UK Limited, "On Remaining Issues In E-PDCCH Search Space Design", 3GPP TSG RAN WG1 Meeting #70bis, R1-124245, Sep. 29, 2012, 7 pages.

* cited by examiner

METHOD AND APPARATUS FOR ALLOCATING CONTROL CHANNEL IN WIRELESS COMMUNICATION SYSTEM

CROSS-REFERENCE TO RELATED APPLICATIONS

This application is the National Stage filing under 35 U.S.C. 371 of International Application No. PCT/KR2012/008847, filed on Oct. 26, 2012, which claims the benefit of U.S. Provisional Application Ser. Nos. 61/551,902, filed on Oct. 26, 2011, 61/563,608, filed on Nov. 25, 2011 and 61/577,074, filed on Dec. 18, 2011, the contents of which are all hereby incorporated by reference herein in their entirety.

BACKGROUND OF THE INVENTION

Field of the Invention

The present invention relates to wireless communications, and more particularly, to a method and apparatus for allocating a control channel in a wireless communication system.

Related Art

The next-generation multimedia wireless communication systems which are recently being actively researched are required to process and transmit various pieces of information, such as video and wireless data as well as the initial voice-centered services. The $4^{th}$ generation wireless communication systems which are now being developed subsequently to the $3^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler Effect resulting from the mobility of a user equipment. A variety of techniques are being developed in order to overcome the abnormal characteristics of the wireless channel and to increase the reliability of wireless communication.

Meanwhile, with the employment of machine-to-machine (M2M) communication and with the introduction and distribution of various devices such as a smart phone, a table personal computer (PC), etc., a data requirement size for a cellular network is increased rapidly. To satisfy a high data requirement size, various techniques are under development. A carrier aggregation (CA) technique, a cognitive radio (CR) technique, or the like for effectively using more frequency bands are under research. In addition, a multiple antenna technique, a multiple base station cooperation technique, or the like for increasing data capacity within a limited frequency are under research. That is, eventually, the wireless communication system will be evolved in a direction of increasing density of nodes capable of accessing to an area around a user. A wireless communication system having nodes with higher density can provide a higher performance through cooperation between the nodes. That is, a wireless communication system in which each node cooperates has a much higher performance than a wireless communication system in which each node operates as an independent base station (BS), advanced BS (ABS), node-B (NB), eNode-B (eNB), access point (AP), etc.

A distributed multi-node system (DMNS) comprising a plurality of nodes within a cell may be used to improve performance of a wireless communication system. The DMNS may include a distributed antenna system (DAS), a radio remote head (RRH), and so on. Also, standardization work is underway for various multiple-input multiple-output (MIMO) techniques and cooperative communication techniques already developed or applicable in a future so that they can be applied to the DMNS. Link quality is expected to be improved by employing the DMNS. However, introduction of a new control channel is also required for application of various MIMO techniques and cooperative techniques to the DMNS.

A method for allocating a new control channel for the DMNS effectively is required.

SUMMARY OF THE INVENTION

The present invention provides a method and apparatus for allocating a control channel in a wireless communication system. The present invention provides a method for configuring an enhanced physical downlink control channel (EPDCCH) in a localized region and a distributed region.

In an aspect, a method for allocating a control channel in a wireless communication system is provided. The method includes allocating an enhanced physical downlink control channel (e-PDCCH) to a localized region in a physical downlink shared channel (PDSCH) region, allocating the e-PDCCH to a distributed region in the PDSCH region, and transmitting a scheduling assignment through the allocated e-PDCCH.

In another aspect, a base station for allocating a control channel in a wireless communication system is provided. The base station includes a radio frequency (RF) unit for transmitting or receiving a radio signal, and a processor connected to the RF unit, and configured to allocate an enhanced physical downlink control channel (e-PDCCH) to a localized region in a physical downlink shared channel (PDSCH) region, allocate the e-PDCCH to a distributed region in the PDSCH region, and transmit a scheduling assignment through the allocated e-PDCCH.

The EPDCCH can be effectively composed.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). $3^{rd}$ generation partnership project (3GPP) long term evolution (LTE) is part of an evolved UMTS (E-UMTS) using the E-UTRA, which employs the OFDMA in downlink and the SC-FDMA in uplink. LTE-advanced (LTE-A) is an evolution of 3GPP LTE.

Hereinafter, for clarification, LTE-A will be largely described, but the technical concept of the present invention is not meant to be limited thereto.

Figure 1:
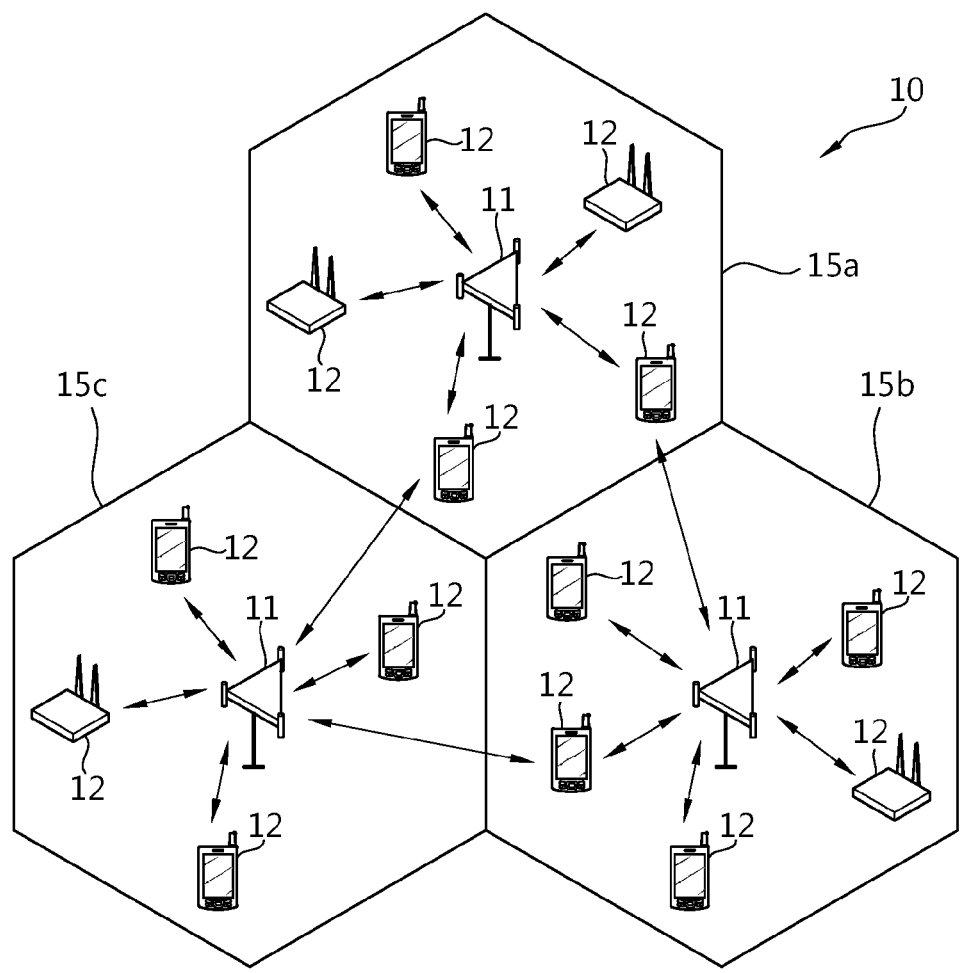
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile user equipment (MT), user equipment (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
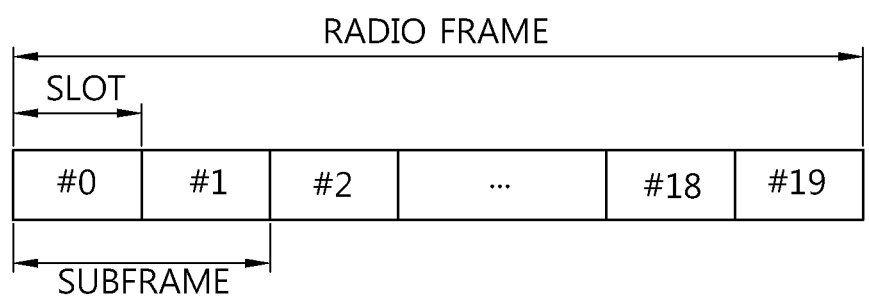
FIG. 2 shows a structure of a radio frame in 3GPP LTE.

FIG. 2 shows a structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A transmission time interval (TTI) is a basic scheduling unit for data transmission. In 3GPP LTE, one TTI may be equal to a time taken for transmitting one subframe. A radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

Figure 3:
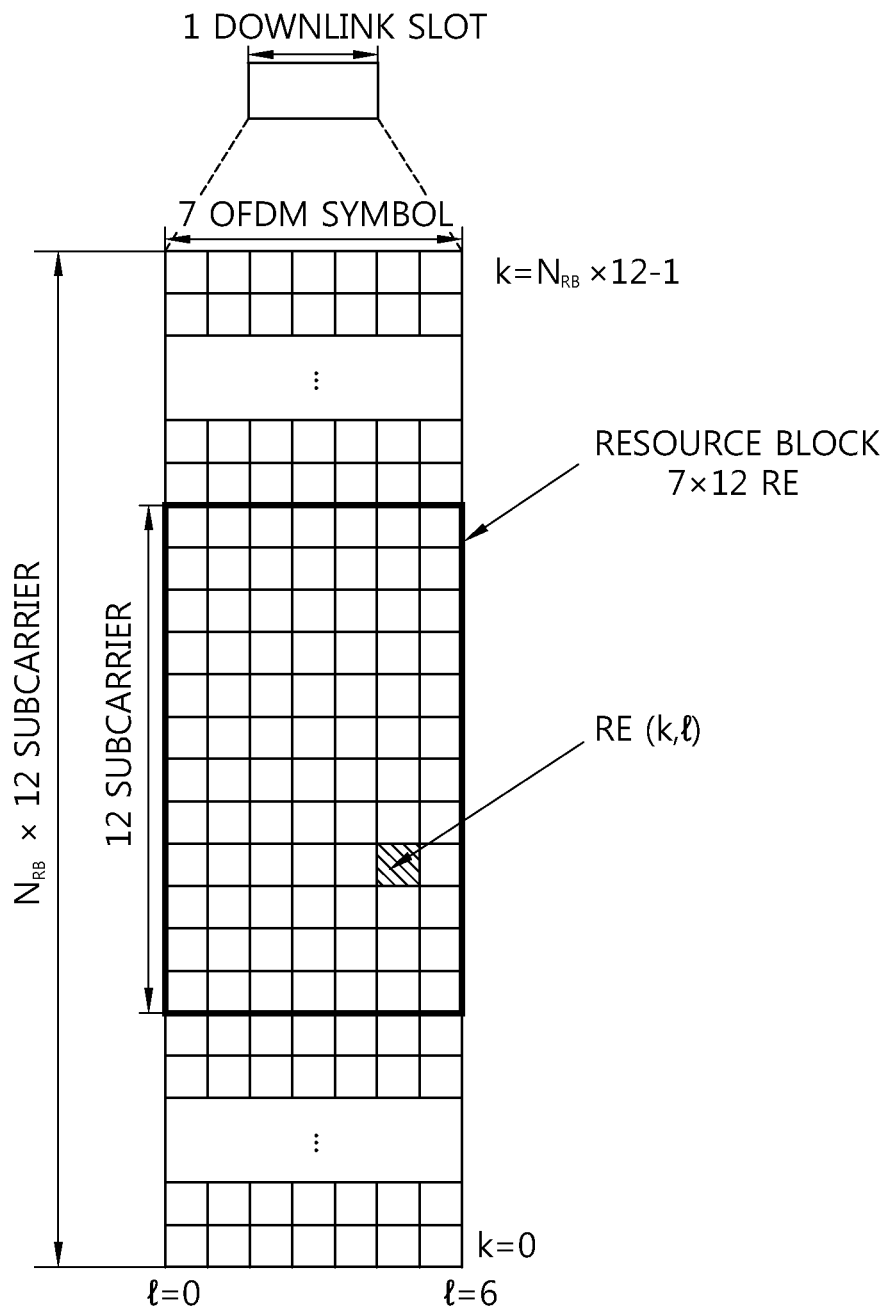
FIG. 3 shows an example of a resource grid of a single downlink slot.

FIG. 3 shows an example of a resource grid of a single downlink slot.

A downlink slot includes a plurality of OFDM symbols in the time domain and NRB number of resource blocks (RBs) in the frequency domain. The NRB number of resource blocks included in the downlink slot is dependent upon a downlink transmission bandwidth set in a cell. For example, in an LTE system, NRB may be any one of 6 to 110. One resource block includes a plurality of subcarriers in the frequency domain. An uplink slot may have the same structure as that of the downlink slot.

Each element on the resource grid is called a resource element. The resource elements on the resource grid can be identified by a pair of indexes (k,l) in the slot. Here, k (k=0, . . . , NRB×12−1) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a CP, frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
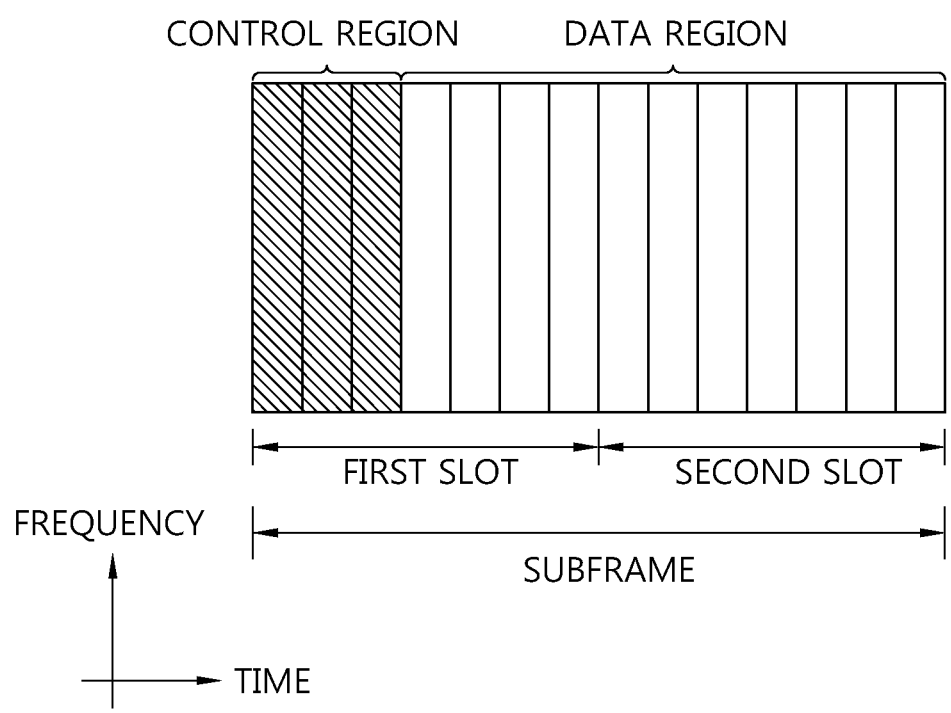
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to 9 resource element groups (REG) including respectively 4 resource elements. 4 quadrature phase shift keying (QPSK) symbols are mapped to each REG. Resource elements occupied by reference signals (RS) are not included in the REG, and the total number of REGs within a given OFDM symbol may be determined according to whether a cell-specific RS (CRS) exists. The format of the PDCCH and the number of bits of the possible PDCCH are determined according to the correlation between the number CCEs and the coding rate provided by the CCEs. The number of CCEs used for transmission of a specific PDCCH may be determined by the base station according to the channel situation. For example, the PDCCH for the UE having a superior channel state may use only one CCE. The PDCCH for the UE having an inferior channel state may need 8 CCEs in order to obtain sufficient robustness. Furthermore, the transmission power of the PDCCH may be adjusted according to the channel state. Table 1 shows supported PDCCH formats and a number of CCEs corresponding to each PDCCH format, etc.

TABLE 1

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
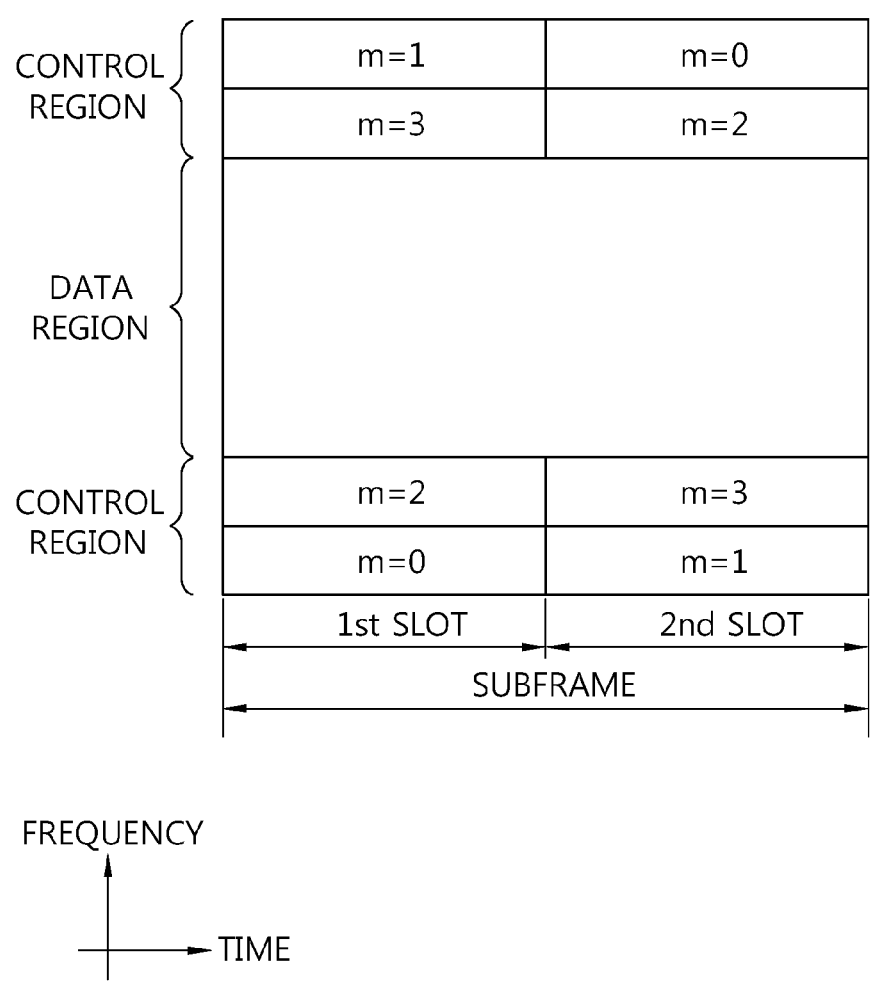
FIG. 5 shows a structure of an uplink subframe.

FIG. 5 shows a structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH for a UE is allocated by a pair of RBs in a subframe. The resource blocks belonging to the pair of RBs occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

To improve a performance of the wireless communication system, a technique is evolved in a direction of increasing density of nodes capable of accessing to an area around a user. A wireless communication system having nodes with higher density can provide a higher performance through cooperation between the nodes.

Figure 6:
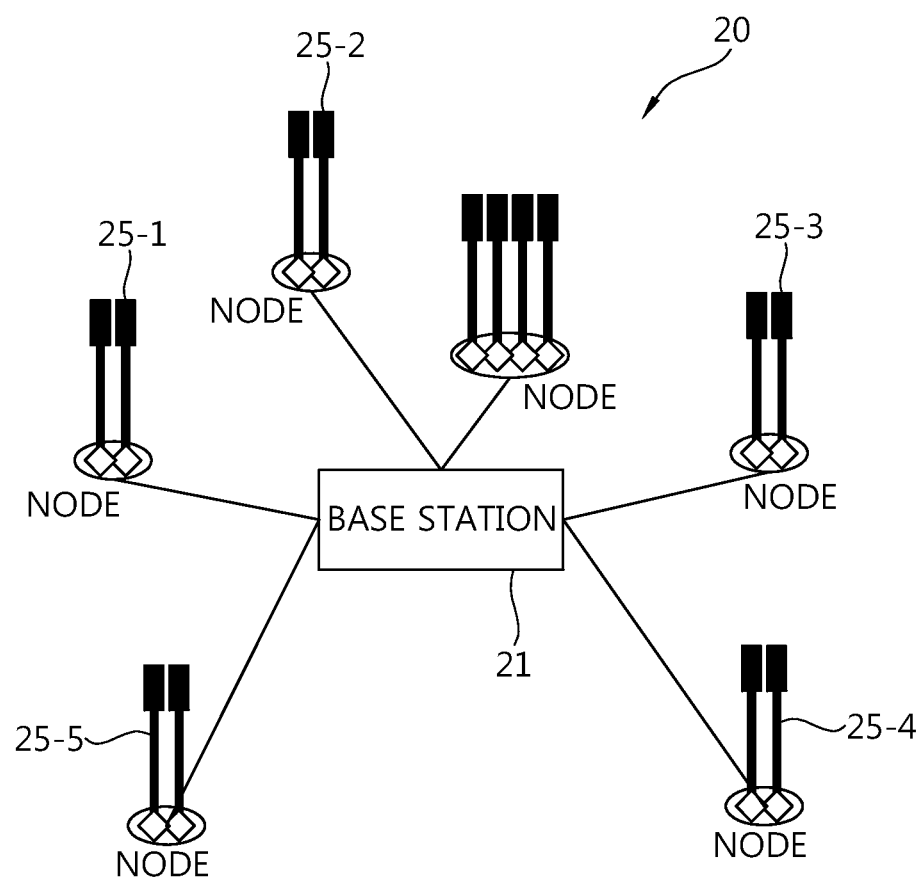
FIG. 6 shows an example of a multi-node system.

FIG. 6 shows an example of a multi-node system.

Referring to FIG. 6, a multi-node system 20 may consist of one BS 21 and a plurality of nodes 25-1, 25-2, 25-3, 25-4, and 25-5. The plurality of nodes 25-1, 25-2, 25-3, 25-4, and 25-5 may be managed by one BS 21. That is, the plurality of nodes 25-1, 25-2, 25-3, 25-4, and 25-5 operate as if they are a part of one cell. In this case, each of the nodes 25-1, 25-2, 25-3, 25-4, and 25-5 may be allocated a separate node identifier (ID), or may operate as if it is a part of an antenna group without an additional node ID. In this case, the multi-node system 20 of FIG. 6 may be regarded as a distributed multi node system (DMNS) which constitutes one cell.

Alternatively, the plurality of nodes 25-1, 25-2, 25-3, 25-4, and 25-5 may have separate cell IDs and perform a handover (HO) and scheduling of the UE. In this case, the multi-node system 20 of FIG. 6 may be regarded as a multi-cell system. The BS 21 may be a macro cell. Each node may be a femto cell or pico cell having cell coverage smaller than cell coverage of a macro cell. As such, if a plurality of cells is configured in an overlaid manner according to coverage, it may be called a multi-tier network.

In FIG. 6, each of the nodes 25-1, 25-2, 25-3, 25-4, and 25-5 may be any one of a BS, a Node-B, an eNode-B, a pico cell eNB (PeNB), a home eNB (HeNB), a remote radio head (RRH), a relay station (RS) or repeater, and a distributed antenna. At least one antenna may be installed in one node. In addition, the node may be called a point. In the following descriptions, a node implies an antenna group separated by more than a specific interval in a DMNS. That is, it is assumed in the following descriptions that each node implies an RRH in a physical manner. However, the present invention is not limited thereto, and the node may be defined as any antenna group irrespective of a physical interval. For example, the present invention may be applied by considering that a node consisting of horizontal polarized antennas and a node consisting of vertical polarized antennas constitute a BS consisting of a plurality of cross polarized antennas. In addition, the present invention may be applied to a case where each node is a pico cell or femto cell having smaller cell coverage than a macro cell, that is, to a multi-cell system. In the following descriptions, an antenna may be replaced with an antenna port, virtual antenna, antenna group, as well as a physical antenna.

Figure 7:
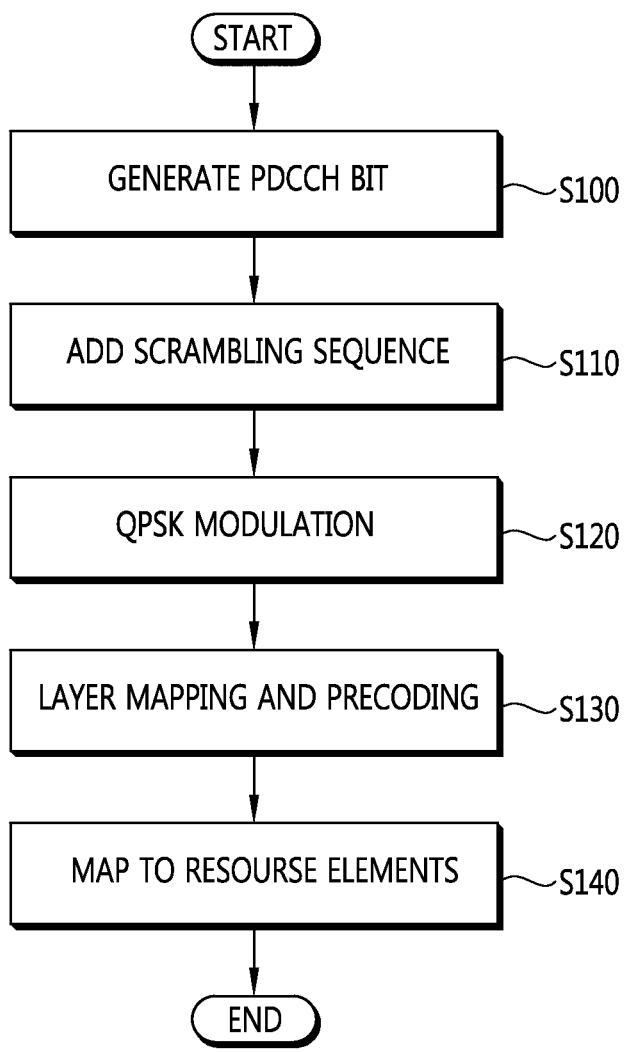
FIG. 7 shows an example of a process in which a PDCCH is mapped to resources.

FIG. 7 shows an example of a process in which a PDCCH is mapped to resources.

In step S100, a PDCCH bit is generated. The PDCCH bit may be denoted by the Equation 1 below.

$$b^{(0)}(0), \ldots, b^{(0)}(M_{bit}^{(0)}-1), b^{(1)}(0), \ldots,$$
$$b^{(1)}(M_{bit}^{(1)}-1), \ldots, b^{(nPDCCH-1)}(0), \ldots,$$
$$b^{(nPDCCH-1)}(M_{bit}^{(nPDCCH-1)}-1) \quad \text{<Equation 1>}$$

$M_{bit}^{(i)}$ represents the number of bits transmitted on the number i of the PDCCH within a one subframe. nPDCCH represents the number of PDCCHs transmitted within the subframe.

In step S110, a scrambling sequence is added to the generated PDCCH bit. The PDCCH bit to which the scrambling sequence is added may be denoted by the Equation 2 below.

$$\tilde{b}(0), \ldots, \tilde{b}(M_{tot}-1), \tilde{b}(i)=(b(i)+c(i)) \bmod 2 \quad \text{<Equation 2>}$$

In step, S120, QPSK modulation is performed on the PDCCH bit to which the scrambling sequence is added. The modulation symbols generated by the QPSK modulation may be denoted by d(0), . . . , d($M_{sym}$b−1).

In step S130, A layer mapping and a precoding are performed on the modulation symbols. The modulation symbols in which the layer mapping and the precoding are performed may be denoted by the Equation 3 below.

$$y(i)=[y^{(0)}(i) \ldots y^{(P-1)}(i)]^T, i=0, \ldots, M_{symb}-1 \quad \text{<Equation 3>}$$

In step S140, the modulation symbols in which the layer mapping and the precoding are performed are mapped to resource elements. That is, y(i) in the Equation 3 is mapped to the resources on an antenna port p. After performing the sub-block interleaving, the modulation symbols are mapped to the REGs in the order of time and frequency. The PDCCH is transmitted on a set of antenna port that is identical to the antenna port on which a physical broadcast channel (PBCH) is transmitted.

Hereinafter, a physical control format indicator channel (PCFICH) is described.

Figure 8:
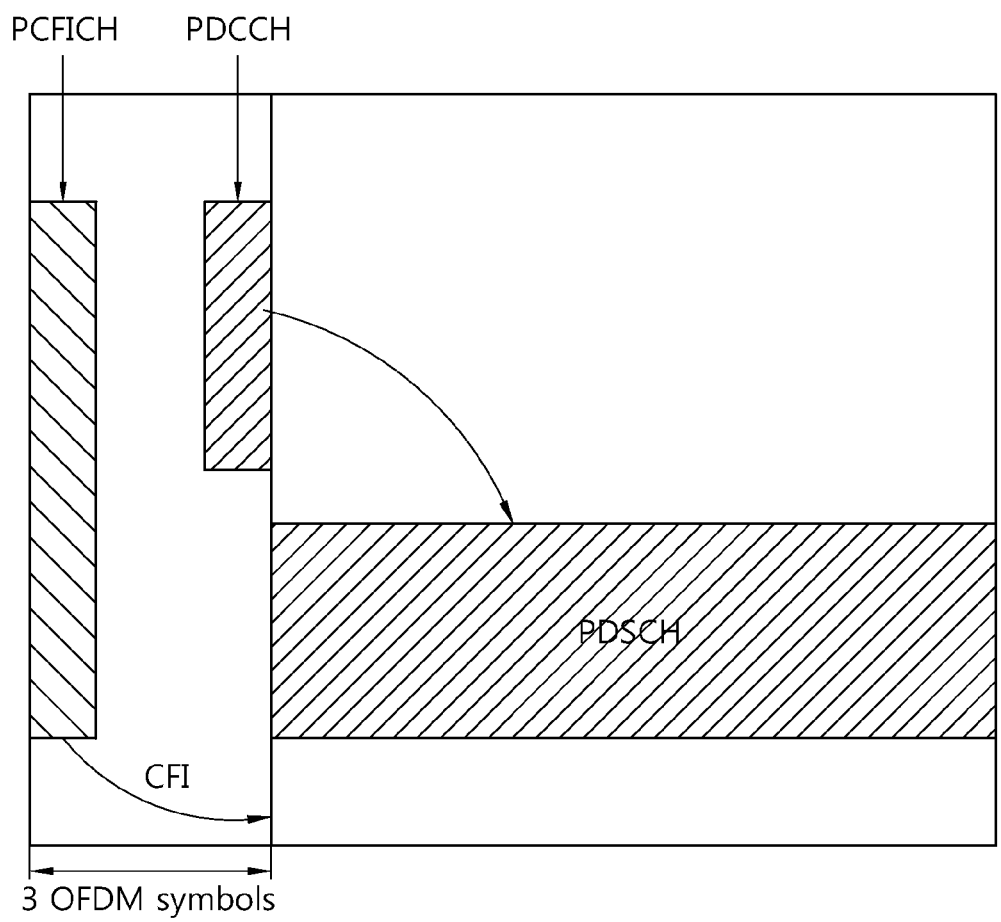
FIG. 8 shows an example where a PCFICH, PDCCH, and PDSCH are mapped to a subframe.

FIG. 8 shows an example where a PCFICH, PDCCH, and PDSCH are mapped to a subframe.

The 3GPP LTE allocates a PDCCH to transmit a downlink control signal intended for controlling UEs. The region to which PDCCHs of a plurality of UEs are mapped is called a PDCCH region or a control region. The PCFICH carries information about the number of OFDM symbols used for allocation of the PDCCH within a subframe. The information about the number of OFDM symbols to which the PDCCH is allocated is called a control formation indicator (CFI). All the UEs within a cell have to search the region to which the PDCCH is allocated, and accordingly, the CIF may be set to a cell-specific value. In general, the control region to which the PDCCH is allocated is allocated to the OFDM symbols at the forefront of a downlink subframe, and the PDCCH may be allocated to a maximum of three OFDM symbols.

Referring to FIG. 8, CIF is set to 3, and accordingly, the PDCCH is allocated to the aforementioned three OFDM symbols within a subframe. The UE detects its own PDCCH within the control region and finds its own PDSCH through the detected PDCCH in the corresponding control region.

The PDCCH in the prior art was transmitted by using transmission diversity in a confined region and does not employ various techniques supporting the PDSCH such as beamforming, multi-user multiple-input multiple-output (MU-MIMO), and best band selection. Also, in case a distributed multi-node system is introduced for system performance enhancement, capacity of the PDCCH becomes short if cell IDs of a plurality of nodes or a plurality of RRHs are identical to each other. Therefore, a new control channel may be introduced in addition to the existing PDCCH. Hereinafter, a control channel newly defined is called an enhanced PDCCH (e-PDCCH). In the description below, e-PDCCH may be used mixed with an ePDCCH or EPD-CCH. The e-PDCCH may be allocated in a data region rather than the existing control region. As the e-PDCCH is defined, a control signal for each node is transmitted for each UE, and the problem of shortage of the PDCCH region can be solved.

As the control region to which the PDCCH is allocated is specified by the PCFICH, a new channel specifying a region to which the e-PDCCH is allocated may be defined. In other words, an enhanced PCFICH (e-PCFICH) may be newly defined, which specifies a region to which the e-PDCCH is allocated. The e-PCFICH may carry part or all of information required for detecting the e-PDCCH. The e-PDCCH may be allocated to a common search space (CSS) within the existing control region or a data region.

Figure 9:
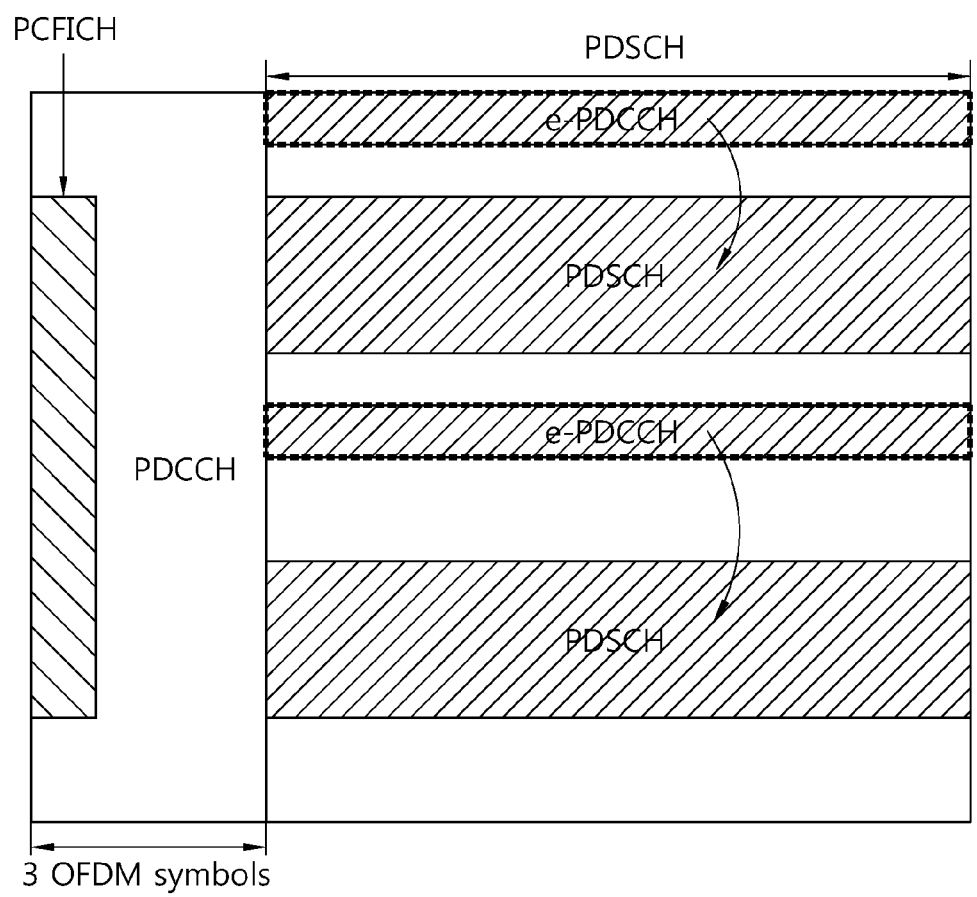
FIG. 9 shows an example of resource allocation through an e-PDCCH.

FIG. 9 shows an example of resource allocation through an e-PDCCH.

The e-PDCCH may be allocated to part of a data region rather than the conventional control region. The e-PDCCH is not provided for the existing legacy UEs, and those UEs supporting the 3GPP LTE rel-11 (hereinafter, they are called rel-11 UEs) may search for the e-PDCCH. The rel-11 UE performs blind decoding for detection of its own e-PDCCH. The information about the minimum region required for detection of the e-PDCCH may be transmitted through a newly defined e-PCFICH or the existing PDCCH. A PDSCH may be scheduled by the e-PDCCH allocated to the data region. A base station may transmit downlink data to each UE through the scheduled PDSCH. In FIG. 9, it is exemplified that the e-PDCCH schedules a PDSCH in the same subframe, but e-PDCCH may schedule a PDSCH allocated to another subframe. However, if the number of UEs connected to each node is increased, the portion of the data region occupied by the e-PDCCH is enlarged. Therefore, the number of blind decoding that has to be performed by the UE is also increased, thus increasing degree of complexity.

Meanwhile, wireless communication systems including relay stations are under development recently. A relay station is intended to extend cell coverage and improve transmission performance. A base station may achieve an effect of extending cell coverage by servicing UEs located at the boundaries of the base station through the relay station. Also, as the relay station improves reliability of signal transmission between the base station and UEs, transmission capacity may be increased. The relay station may be utilized in such a case where a UE is located in a shadow region though the UE may stay within coverage of the base station. The uplink and the downlink between the base station and the relay station are backhaul links while the uplink and the downlink between the base station and a UE, or between the relay station and a UE are access links. Hereinafter, a signal transmitted through the backhaul link is called a backhaul signal, and a signal transmitted through the access link is called an access signal.

Relay zones may be defined in a wireless communication system including relay stations. A relay zone refers to an interval within a downlink subframe transmitted by a base station, where transmission of a control channel (hereinafter, R-PDCCH) for a relay station or transmission of a data channel (hereinafter, R-PDSCH) for the relay station is performed. In other words, the relay zone indicates an interval within a downlink subframe, where backhaul transmission is performed. Transmission between the base station and the relay station is restricted only in the relay zone within a slot. A PDSCH for transmission between the base station and the relay station is processed in the same way as the PDSCH is processed when the relay station is not employed, and the processed PDSCH is mapped to resource elements. However, the corresponding PDSCH is mapped only to the resource elements within the relay region, and if the R-PDCCH is allocated to a first slot of an RB pair, the corresponding PDSCH is not mapped to the first slot of the RB pair.

The R-PDCCH carries DCI for the relay station. The R-PDCCH may be allocated to OFDM symbols of a first slot ranging from the fourth to the last OFDM symbol or OFDM symbols of a second slot ranging from the first to the last OFDM symbol. In frequency domain, a plurality of virtual RBs (VRBs) to which the R-PDCCH can be allocated may be configured by a higher layer. Without being cross-interleaved with other R-PDCCHs in a given physical RB (PRB), the R-PDCCH may be transmitted on one or more PRBs. In other cases, a plurality of R-PDCCHs may be cross-interleaved with each other in one or more PRBs.

Figure 10:
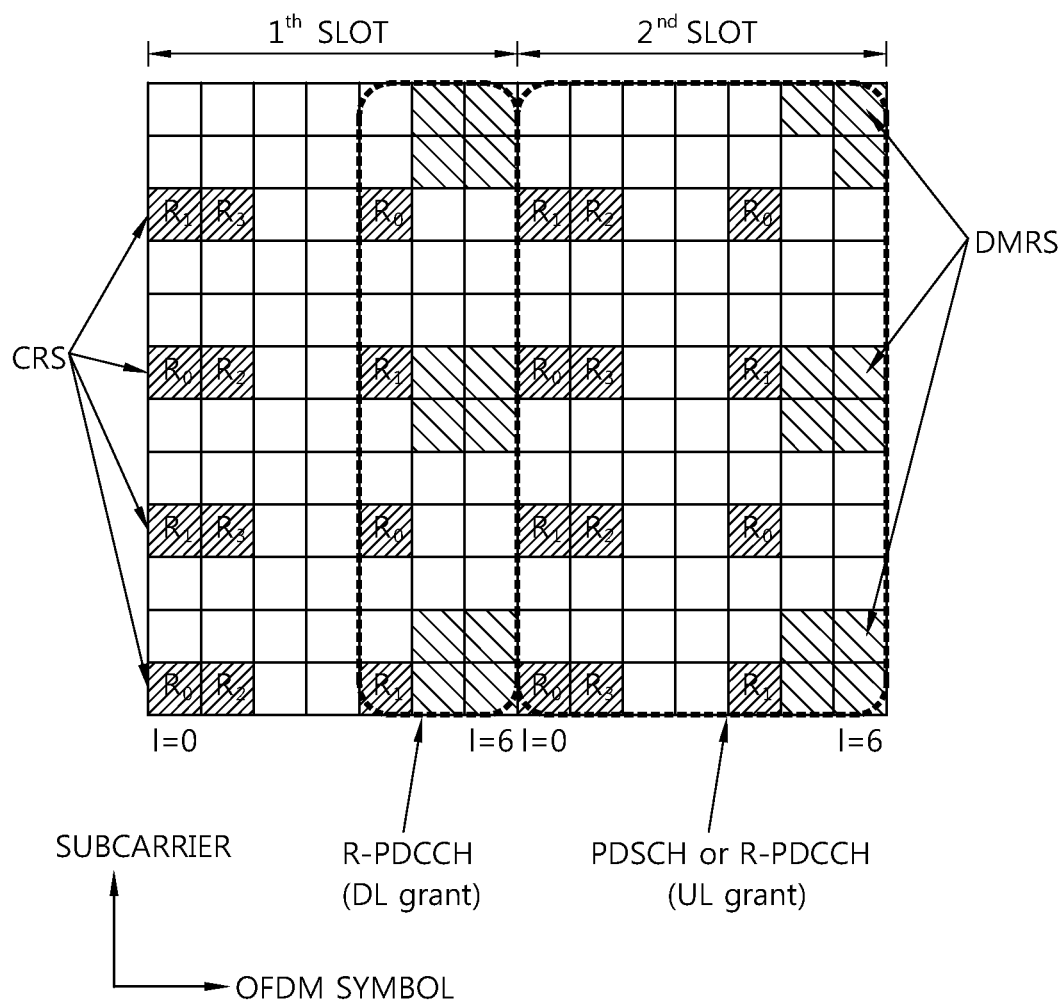
FIG. 10 shows an example of an R-PDCCH allocated to an RB.

FIG. 10 shows an example of an R-PDCCH allocated to an RB.

Referring to FIG. 10, only a DL grant is allocated to a first slot of the RB, and a UL grant or a PDSCH is allocated to a second slot. In this case, the R-PDCCH may be allocated to the remaining REs other than the REs to which a control region, CRS, and DMRS are mapped. Both of the CRS and DMRS may be used for demodulation of the R-PDCCH. If the DMRS is used for demodulation of the R-PDCCH, the antenna port 7 and a scrambling ID (SCID) of 0 may be used. On the other hand, if the CRS is used for demodulation of the R-PDCCH, the antenna port 0 may be used when only one PBCH transmission antenna is employed, whereas if two or four PBCH transmission antennas are used, Tx diversity mode is activated, and antenna ports 0-1 or 0-3 may be utilized.

In allocating an e-PDCCH newly defined for a multi-node system, the structure of the existing R-PDCCH described in FIG. 10 may be re-used. In other words, only the DL grant may be allocated to the first slot in the RB, and the UL grant or the PDSCH may be allocated in the second slot. Also, the e-PDCCH may be allocated to the remaining REs other than the REs to which the control region, CRS, and DMRS are mapped. By adopting the existing structure, the e-PDCCH may be allocated without exerting a large influence on the existing standards.

Figure 11:
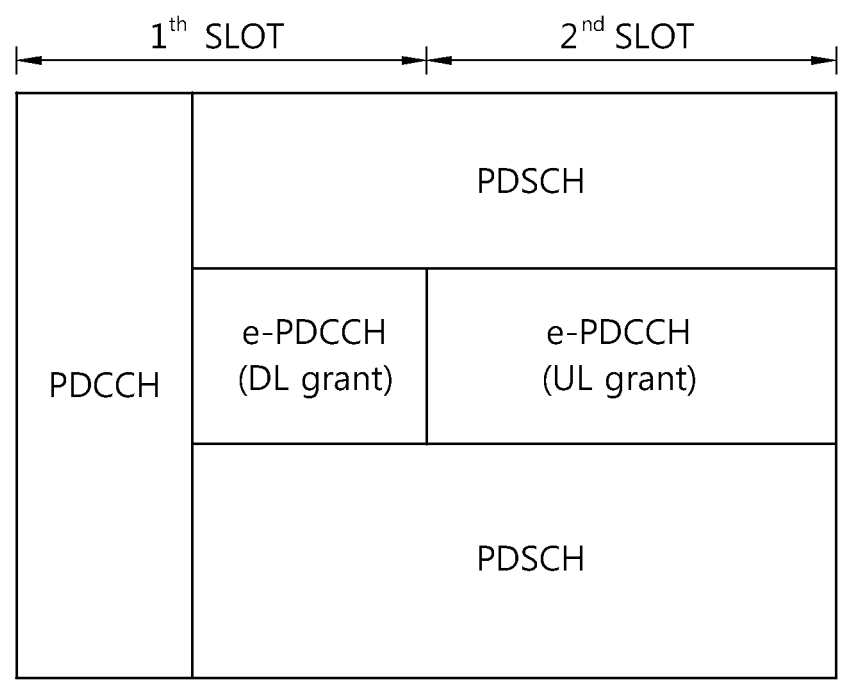
FIG. 11 shows an example of an e-PDCCH which is allocated to an RB.
Figure 11:

FIG. 11 shows an example of an e-PDCCH which is allocated to an RB.

Referring to FIG. 11, it is assumed that the e-PDCCH is configured in both of the first slot and the second slot within the RB. Only DL grant may be allocated to the e-PDCCH which is allocated to the first slot, and UL grant may be allocated to the e-PDCCH which is allocated to the second slot. The DL grant may represent the DCI format (DCI format 1, 1A, 1B, 1C, 1D, 2, 2A, etc.) which transmits the downlink control information on the UE, and the UL grant may represent the DCI format (DCI format 0, 4) which transmits the uplink control information on the UE. Since the DL grant and the UL grant which are to be detected by slot within the RB are divided, the UE may perform a blind decoding for detecting the DL grant by composing a search apace in the first slot, and may also perform a blind decoding for detecting the UL grant by composing a search space in the second slot.

Meanwhile, in 3GPP LTE, a DL transmission mode (1~9) and a UL transmission mode (1~2) exist. One transmission mode for the DL and the UL respectively may be allocated to each UE through the higher-layer signaling. In the DL transmission mode, there are 2 DCI formats which each UE should detect for each transmission mode. In this regard, the number of blind decoding which should be performed by the UE to detect the DL grant is 16*2=32. In the UL transmission mode, the number of DCI formats which each UE should detect for each transmission mode is 1 or 2. For example, if the UL transmission mode is 1, the UE detects only DCI format 0, and if the UL transmission mode is 2, the UE detects DCI format 0 and 4. Accordingly, the number of blind decoding which the UE should perform to detect the UL grant is 16*1=16 if the UL transmission mode is 1, and 16*2=32 if the UL transmission mode is 2.

Figure 12:
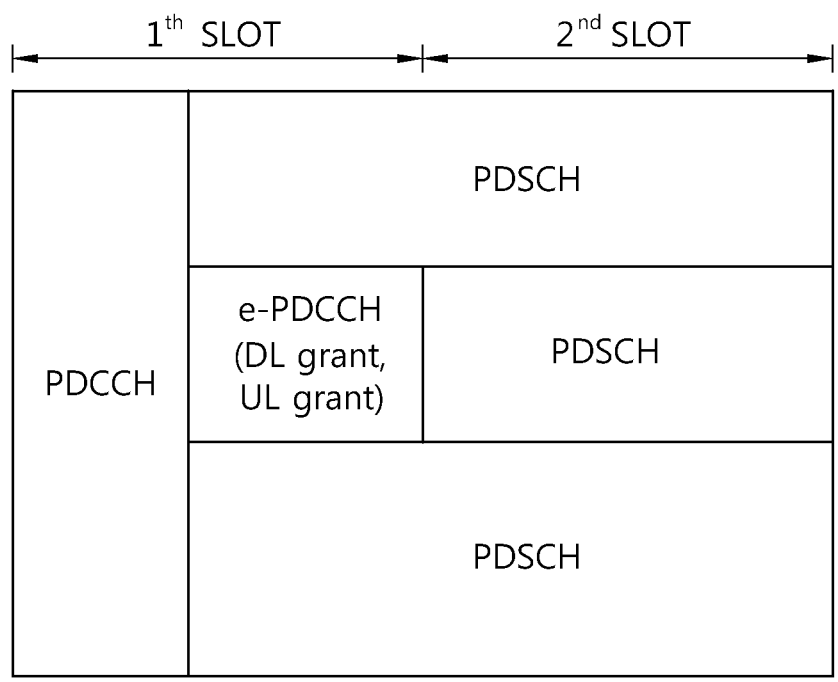
FIG. 12 shows another example of an e-PDCCH which is allocated to an RB.

FIG. 12 shows another example of an e-PDCCH which is allocated to an RB.

Referring to FIG. 12, it is assumed that the e-PDCCH is configured only in the first slot within the RB. That is, both of the DL grant and UL grant may be allocated to the e-PDCCH which is allocated to the first slot at the same time. Accordingly, the DL grant and the UL grant exist both in the e-PDCCH of the first slot at the same time. The UE performs blind decoding to detect the DL grant and the UL grant by configuring the search region in the first slot. As described above, each transmission mode for the DL and the UL respectively may be allocated to each UE through the high-layer signaling. In the DL transmission mode, there are 2 DCI formats which each UE should detect for each transmission mode, and all of the DL transmission modes basically include DCI format 1A for supporting fall-back mode. The number of blind decoding which the UE should perform to detect the DL grant is 16*2=32. In the UL transmission mode, the number of DCI formats which each UE should detect for each transmission mode is 1 or 2. If the UL transmission mode is 1, the UE detects only DCI format 0, and if the UL transmission mode is 2, the UE detects DCI format 0and 4. However, DCI format 0has the same length as DCI format 1A does, and it can be distinguished through the flag of 1 bit, and additional blind decoding is not necessary. Accordingly, the number of blind decoding which the UE should perform to detect the UL grant is 0 if the UL transmission mode is 1, and 16*1=16 if the UL transmission mode is 2.

Figure 13:
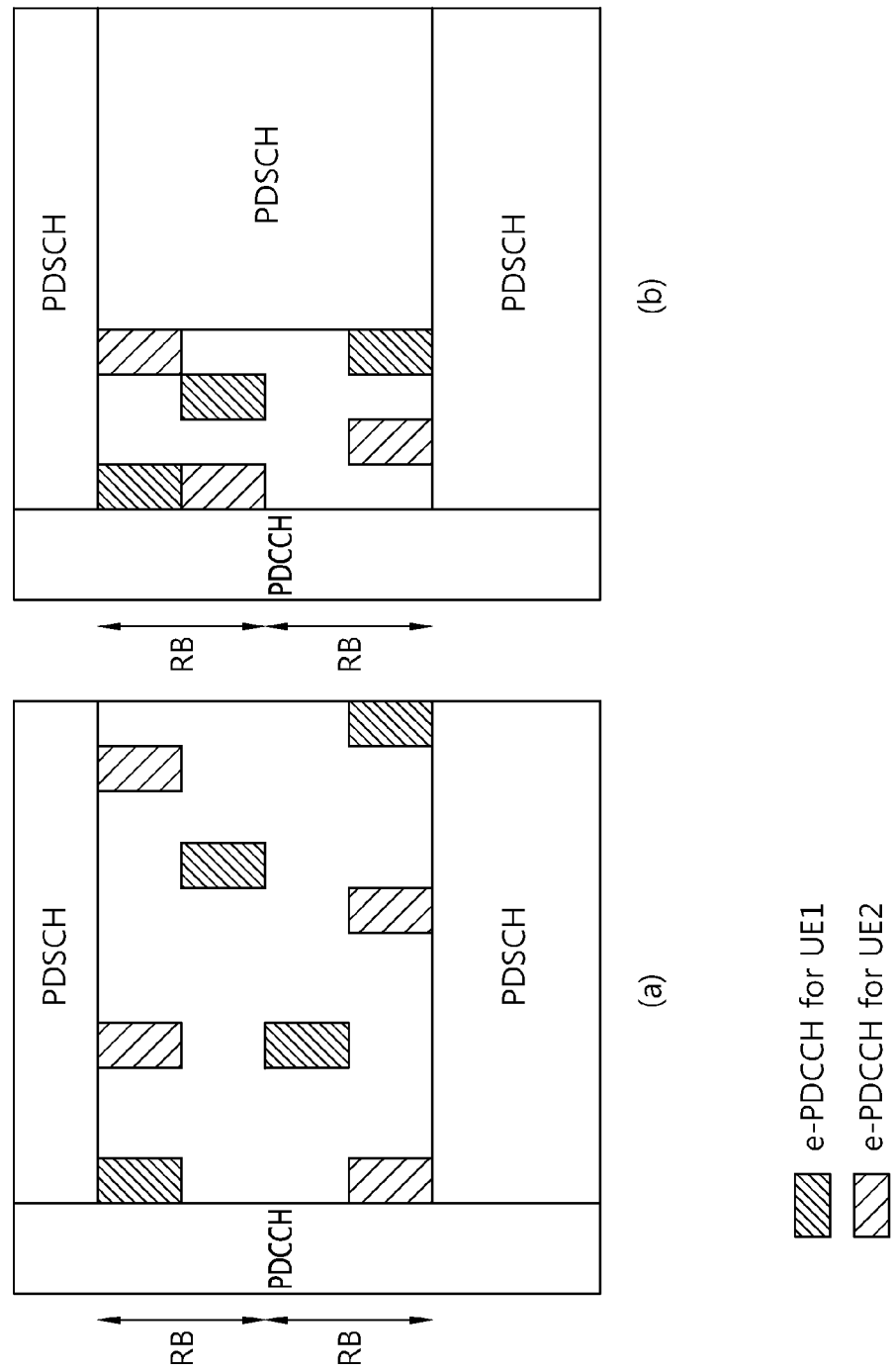
FIG. 13 shows another example of an e-PDCCH which is allocated to an RB.

FIG. 13 shows another example of an e-PDCCH which is allocated to an RB.

Referring to FIG. 13, the e-PDCCH of each UE is multiplexed in the time domain or the frequency domain. That is, in the state that common PRB set is configured, the e-PDCCH of each UE is cross-interleaved into the time domain or the frequency domain. FIG. 13-(*a*) is the case that the e-PDCCH is allocated to both of the first slot and the second slot of the RB, and FIG. 13-(*b*) is the case that the e-PDCCH is allocated only to the first slot of the RB. In FIG. 13, it can be shown that the e-PDCCH of each UE is divided into several numbers and allocated. In this regard, the diversity gain can be obtained in the time domain or the frequency domain.

Hereinafter, a method for configuring the e-PDCCH according to an embodiment of the present invention is described.

First, the e-PDCCH may be allocated to multiple PRBs. Each e-PDCCH may be allocated in localized manner within multiple PRBs. That is, the e-PDCCH may be allocated physically contiguously in the time domain or the frequency domain. Or, each e-PDCCH may be allocated in distributed manner within the multiple PRBs. That is, the e-PDCCH may be allocated with physically distributed in the time domain or the frequency domain. For example, in FIG. 13, the e-PDCCHs for multiple UEs may be dispersedly allocated into the time domain or the frequency domain with being cross-interleaved. By allocating the e-PDCCH in distributed manner, the frequency diversity may be obtained.

The region to which the e-PDCCH of one UE can be allocated may be either of the first region or the second region, or both of the first region and the second region. The first region and the second region may be distinguished by the standard described below.

1) The first region to which the e-PDCCH of the minimum aggregation level is transmitted from a PRB or a pair of PRBs and the second region to which the e-PDCCH of the minimum aggregation level is transmitted from multiple PRBs or multiple pair of PRBs: The first region may correspond to the region to which the e-PDCCH is allocated in localized manner as described above, and the second region may correspond to the region to which the e-PDCCH is allocated in distributed manner as described above.

2) The first region in which the e-PDCCH for one UE is transmitted only through a part of antenna ports among the N number of antenna ports given to the e-PDCCH set region and the second region in which the e-PDCCH for one UE is transmitted through all given antenna ports: The antenna port given to the e-PDCCH region may be the e-PDCCH port which is the antenna port for the e-PDCCH.

3) The first region in which the UE of transmission mode which corresponds to the closed-loop (CL)-MIMO searches and the second region in which the UE of transmission mode which detects DCI format 1A or corresponds to open-loop (OL)-MIMO searches 4) The first region in which the e-PDCCH is transmitted through one layer and the second region in which the e-PDCCH is transmitted by space-frequency block coding (SFBC)/space-time block coding (STBC)

5) The first region to which beamforming or adaptive beamforming is applied and the second region to which the transmit diversity (TxD) such as SFBC/STBC or non-adaptive beamforming is applied 6) The first region in which CCE/e-CCE is configured or mapped to an RB or a pair of RBs and the second region in which CCE/e-CCE is configured or mapped to multiple RBs by being divided.

7) The first region in which the search space of the e-PDCCH is configured or mapped to the continuous RB or a continuous pair of RBs and the second region in which the search space of the e-PDCCH is configured or mapped to the distributed RB or a distributed pair of RBs By the standards above, the e-PDCCH of a UE may be allocated to the first region and/or the second region.

Also, the region to which multiple e-PDCCHs are allocated may also be physically one or at least two. If the region to which the e-PDCCH is allocated is at least two, the e-PDCCH which is allocated to each region may be configured in the same manner or different manners.

In the description below, it is assumed that the first region and the second region are distinguished according to the standard 1). That is, the first region is a region in which the e-PDCCH of the minimum aggregation level is transmitted from a PRB or a pair of PRBs, and the second region is a region in which the e-PDCCH of the minimum aggregation level is divisionally transmitted from multiple PRBs or multiple pair of PRBs. In other words, the first region is a region in which the e-PDCCHs are allocated in localized manner, and the second region is a region in which the e-PDCCHs are allocated in distributed manner. Also, although it is exemplified that the region in which the e-PDCCHs are allocated in localized manner is a non-interleaving region and the region in which the e-PDCCHs are allocated in distributed manner is an interleaving region, the method for configuring the e-PDCCH according to an embodiment of the present invention is not limited thereto.

Figure 14:
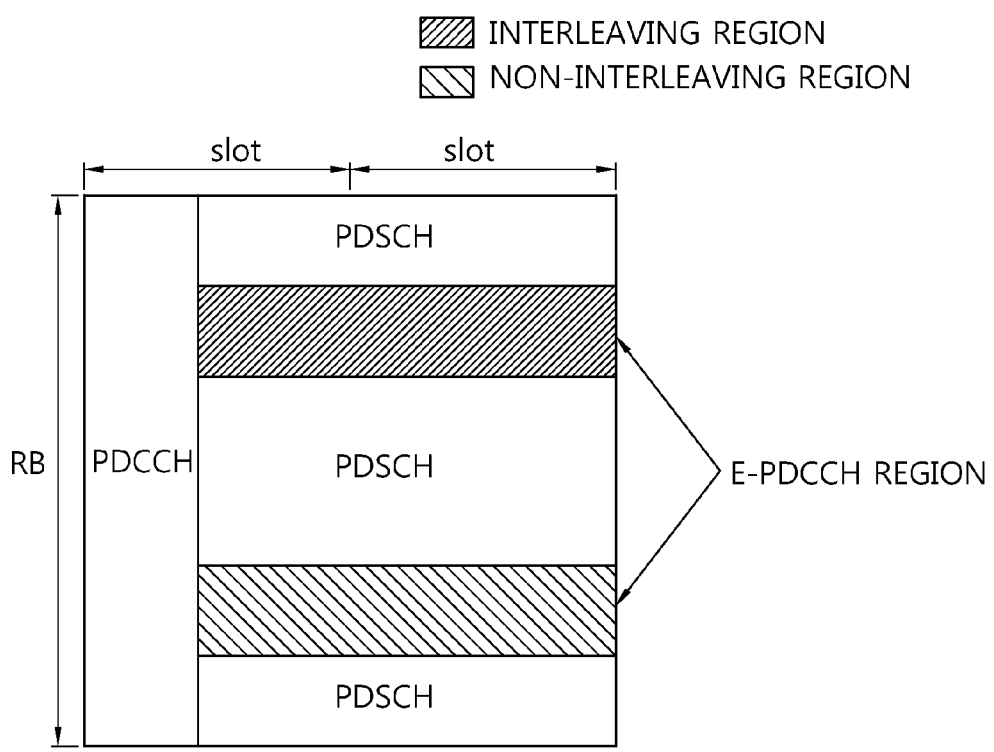
FIG. 14 shows an example of a method for configuring an e-PDCCH according to an embodiment of the present invention.

FIG. 14 shows an example of a method for configuring an e-PDCCH according to an embodiment of the present invention.

Referring to FIG. 14, the e-PDCCH is allocated to the PDSCH region. In this time, the e-PDCCH may be divided and allocated to the interleaving region and the non-interleaving region. If the e-PDCCH is allocated to both of the interleaving region and the non-interleaving region, the interleaving region and the non-interleaving region should not be coexisted but separately allocated.

The interleaving region represents a region to which each e-PDCCH is dispersedly allocated. That is, although the interleaving region itself is configured near to the frequency domain, each e-PDCCH is dispersedly allocated in the interleaving region. The interleaving region represents an example of a region to which the e-PDCCH is dispersedly allocated. Each e-PDCCH may be made up of a plurality of units, and each unit may have a smaller size than the RB's. An RB may include more than one unit of multiple e-PDCCH, or the e-PDCCH and the PDSCH may be included all together. For example, multiple e-PDCCHs may be allocated with being jointly encoded. In this time, the number of RE which is occupied by the e-PDCCH port may be small for the UE to decode the e-PDCCH using only the e-PDCCH port included in the e-PDCCH which is allocated to the UE itself Also, the overhead may be large for the base station to perform individually signaling the e-PDCCH port to each of unit which is configuring the e-PDCCH. Also, since it is unable to set up the e-PDCCH for each UE to the frequency region which is preferred by each UE, it is also hard to set up a beamforming vector to obtain UE-specific beamforming gain. Accordingly, the e-PDCCH port and/or the value of the procoding vector which is used in the overall e-PDCCH region may be pre-fixed by one or more, or may notify to the UEs through the RRC signaling, etc. The UEs which is able to detect the e-PDCCH port and/or the value of the precoding vector used in the e-PDCCH region may estimate channel by using the e-PDCCH port which is allocated to the e-PDCCH region even though there is no e-PDCCH which is allocated to itself If precoding is not performed, it is not necessary to detect the value of the precoding vector.

The non-interleaving region represents a region to which each e-PDCCH is allocated in localized manner without being dispersed. The non-interleaving region represents an example of a region to which the e-PDCCH is allocated in localized manner. Each e-PDCCH is not mixed one another but has its own region, and is able to be decoded in its e-PDCCH port.

Figure 15:
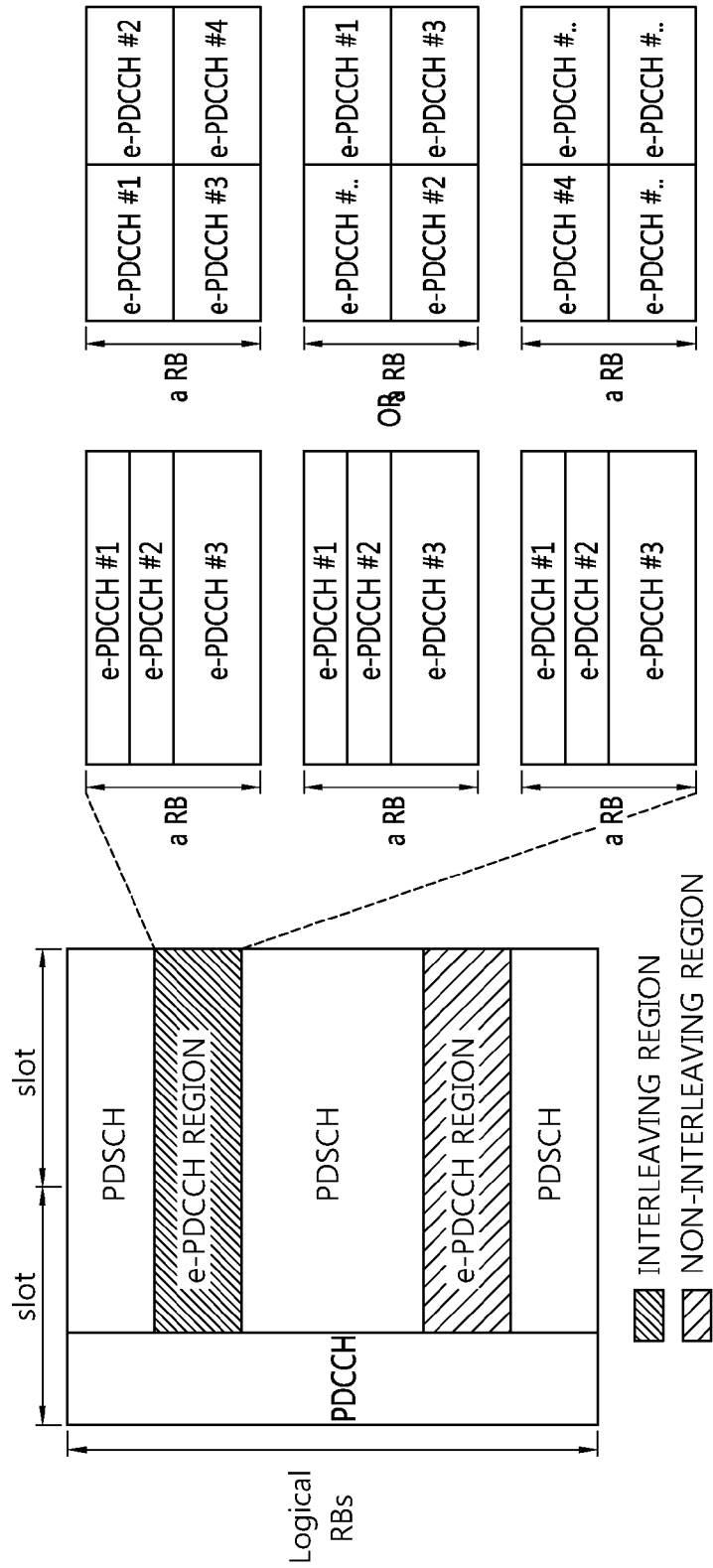
FIG. 15 shows another example of a method for configuring an e-PDCCH according to an embodiment of the present invention.

FIG. 15 shows another example of a method for configuring an e-PDCCH according to an embodiment of the present invention.

FIG. 15-(a) is identical to FIG. 14. FIG. 15-(b) represents an example in which multiple e-PDCCHs are configured in the interleaving region. It is assumed that the basic unit which allocates the e-PDCCH within an RB is maximum 4 along the frequency axis in FIG. 15-(b). The first e-PDCCH for the first UE, the second e-PDCCH for the second UE and the third e-PDCCH for the third UE are allocated to an RB, and each e-PDCCH is dispersedly allocated to each RB according to interleaving. Also, a specific e-PDCCH may be continuously assigned to a plurality of basic units. In FIG. 15-(b), two basic units are assigned to the third e-PDCCH for the third UE.

FIG. 15-(c) shows another example in which multiple e-PDCCHs are configured in the interleaving region. It is assumed that the basic unit which allocates the e-PDCCH within an RB is maximum 4 along the time axis and the frequency axis in FIG. 15-(c). The first e-PDCCH for the first UE, the second e-PDCCH for the second UE, the third e-PDCCH for the third UE and the fourth e-PDCCH for the fourth UE are allocated to an RB, and each e-PDCCH is dispersedly allocated to each RB according to interleaving. In FIG. 15-(b), two basic units are assigned to the third e-PDCCH for the third UE. The location of the e-PDCCH which is allocated to each RB may change according to the RB.

If the e-PDCCH is allocated in localized manner, the physical resource may be given by a unit of enhanced REG (e-REG). An enhanced CCE (e-CCE) may be mapped to a pair of PRBs. A single antenna port which is used for transmitting the e-PDCCH may be determined based on the e-CCE index that defines the e-PDCCH resource. If the e-PDCCH is allocated in distributed manner, the physical resource may be given by a unit of the e-REG. Each resource element in the e-REG may alternately connect to either of the two antenna ports.

Meanwhile, the e-PDCCH may be differently configured according to contents, to the region of configuration, or to the UE. For example, the base station may transmit the control information (for example, paging, random access (RA) and system information (SI)) which is identically transmitted to the existing UE such as the Rel-8 UE or the Rel-10 UE through the PDCCH in the existing way, and may transmit the control information (for example, transmit power control (TPC) command) which is commonly transmitted only to the Rel-11 UEs through the CSS of the e-PDCCH which is allocated to the interleaving region. The Rel-11 UE may read the control information which is transmitted to itself by detecting the PDCCH and the e-PDCCH respectively. Or, the base station may transmit all of the control information which is identically transmitted to the existing UEs and the control information which is commonly transmitted only to the Rel-11 UEs through the CSS of the e-PDCCH which is allocated to the interleaving region. The Rel-11 UE may read the control information which is transmitted to itself by detecting the e-PDCCH in the CSS.

Or, the UE-specific control information for the Rel-11 UEs may be transmitted through the e-PDCCH which is allocated to the interleaving region or the non-interleaving region according to the speed of the UE or other circumstances. For example, the e-PDCCH for the UE of high speed, the UE of low path loss or the UE in bad channel environment may be allocated to the interleaving region, and the e-PDCCH for the UE of low speed, the UE of high path loss or the UEs in good channel environment may be allocated to the non-interleaving region. The values correspond to such as the speed of the UE, the path loss and the channel environment may be transmitted to the higher layer such as the radio resource control (RRC), or may be measured by comparing a certain threshold value which is determined by the UE. Or, the base station may directly notify the region which the UE should read through the message of higher layer such as the RRC message.

Hereinafter, the detailed embodiment which changes the configuration of the e-PDCCH according to contents is described.

For example, the control information which is commonly transmitted to the Rel-11 UEs may be distinguished according to the RNTI. That is, the control information with the common RNTI may be transmitted through the CSS of the e-PDCCH which is allocated to the interleaving region. In this time, the Rel-11 UEs may receive the control information same with that of the existing UE through the PDCCH. The common RNTI may include SI-RNTI, P-RNTI, RA-RNTI, temporary C-RNTI, TPC-RNTI, semi-persistent scheduling (SPS)-RNTI, C-RNTI, or etc. The RA-RNTI may be utilized on the PDCCH when the random access response message is transmitted. The RA-RNTI may distinguish which time-frequency resource is used when the UE transmits the random access preamble. The temporary C-RNTI is a temporary identifier which is used by the UE during random access. The size of the temporary C-RNTI may be 16 bits. The UE-specific RNTI may include the C-RNTI or the SPS-RNTI.

Or, the Rel-11 UE may configure the e-PDCCH to detect DCI format 1A only in the interleaving region and to detect the remaining DCI formats in the non-interleaving region. For example, if the DCI format used in transmission mode 9 exists, if the base station may transmit DCI format 1A through the e-PDCCH which is allocated to the interleaving region and transmit DCI format 2C through the e-PDCCH which is allocated to the non-interleaving region, the UE may decrease the number of blind decoding performed in each region. In this case, the DCI format that should be detected in the CSS such as DCI format 3, 3A, etc., may also be transmitted through the e-PDCCH which is allocated to the interleaving region. Table 2 represents an example of the search space and the transmission scheme which correspond to DCI format 1A and DCI format 2C.

TABLE 2

| DCI format | Search space | Transmission scheme of PDSCH which corresponds to the PDCCH |
| --- | --- | --- |
| DCI format 1A | CSS and USS according to C-RNTI | non-MBSFN subframe: if the number of the PBCH antenna port is 1, use the single antenna port (antenna port 0)/otherwise, use TD MBSFN subframe: single antenna port (antenna port 7) |
| DCI format 2C | USS according to C-RNTI | Antenna ports 7-14 for maximum 8 layer transmission |

Or, the e-PDCCH that supports the MU-MIMO may be allocated to the non-interleaving region.

Or, the control information which is commonly transmitted to the Rel-11 UEs may be transmitted through the e-PDCCH which is allocated to both of the interleaving region and the non-interleaving region. In this time, the Rel-11 UE may receive all of the common control information and the UE-specific control information by determining the region including the control information of its own self, and by decoding the corresponding region only. The Rel-11 UE may determine the region in which its control information is included through the signaling of the base station or by the way of selecting a specific region by comparing the channel state with a specific threshold value. Or, the region which is previously received may be a region in which its control information is included as it is. That is, the Rel-11 UE may read the control information which is transmitted through the non-interleaving region if the latest PDSCH which is previously received is allocated in localized manner, and may read the control information which is transmitted through the interleaving region if the latest PDSCH which is previously received is allocated in distributed manner. Thus, the Rel-11 UE may decrease overhead by decoding only the region in which its control information is included.

Or, the base station may transmit the control information of which the aggregation level is high through the e-PDCCH which is allocated to the interleaving region, and may transmit the control information of which the aggregation level is low through the e-PDCCH which is allocated to the non-interleaving region. For example, the e-PDCCH which is allocated to the interleaving region is configured as aggregation level 4 or 8 only, and the e-PDCCH which is allocated to the non-interleaving region is configured as aggregation level 1 or 2 only.

Table 3 represents the number of the e-CCE according to the e-PDCCH format and the resource allocation. Each e-CCE may include multiple e-REGs.

TABLE 3

| | $N_{ECCE}$ | | | |
| --- | --- | --- | --- | --- |
| | Normal subframe and Special subframe of configuration 3, 4 and 8 satisfying $n_{EPDCCH}$ < 104 and utilizing normal CP | | Different case | |
| EPDCCH format | Localized allocation | Distributed allocation | Localized allocation | Distributed allocation |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

Referring to Table 3, the case in which the e-PDCCH format 4 is allocated in localized manner is not defined. However, the case in which the e-PDCCH format 4 is allocated in distributed manner may be defined by 16 or 32 number of the e-CCEs. That is, the e-PDCCH with high aggregation level may be defined only in the region to which the e-PDCCH is allocated in distributed manner.

Figure 16:
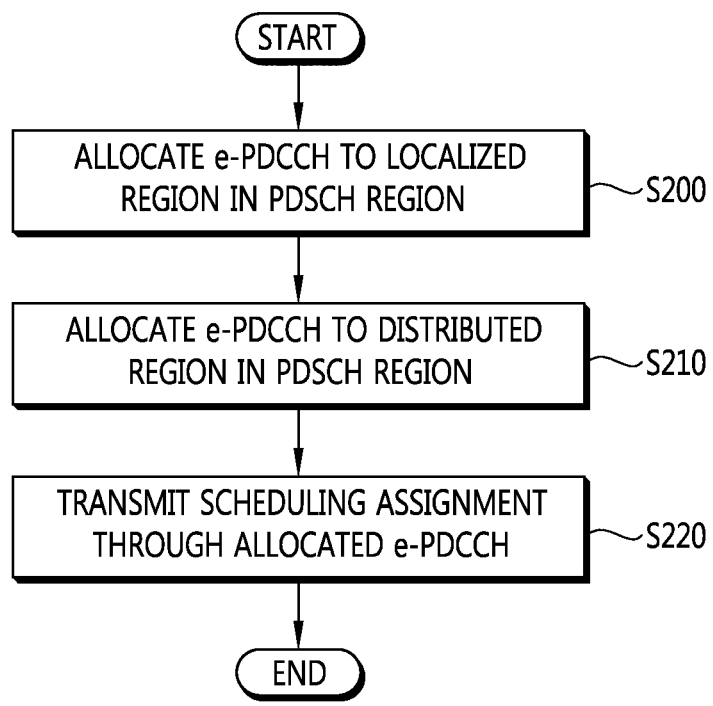
FIG. 16 shows an example of a method for allocating an e-PDCCH according to an embodiment of the present invention.

FIG. 16 shows an example of a method for allocating an e-PDCCH according to an embodiment of the present invention.

In step S200, the base station allocates the e-PDCCH in a localized region within the PDSCH region, and in step S210, the base station allocates the e-PDCCH in a distributed region within the PDSCH region. The e-PDCCH may be configured by various methods as described above. In step, S220, the base station transmits the scheduling assignment through the allocated e-PDCCH.

Figure 17:
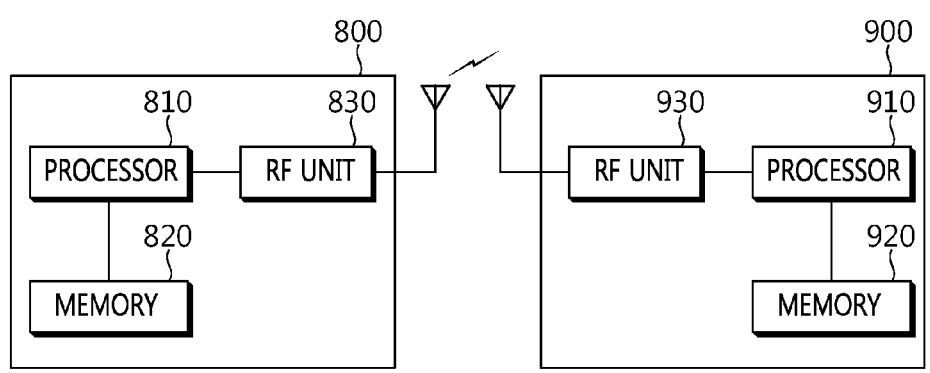
FIG. 17 is a block diagram showing wireless communication system to implement an embodiment of the present invention.

FIG. 17 is a block diagram showing wireless communication system to implement an embodiment of the present invention.

ABS 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for allocating a control channel in a wireless communication system, the method comprising:
    allocating an enhanced physical downlink control channel (e-PDCCH); and
    transmitting a scheduling assignment through the allocated e-PDCCH,
    wherein the allocating the e-PDCCH comprises:
        when an enhanced control channel element (CCE) aggregation level of a corresponding e-PDCCH format is below a predetermined value, allocating the e-PDCCH to a localized region which is contiguously configured in a frequency domain, or a distributed region which is dispersedly configured in the frequency domain; and
        when the e-CCE aggregation level is not below the predetermined value, allocating the e-PDCCH to only to the distributed region.

2. The method of claim 1,
    wherein the localized region is a region in which an e-PDCCH of a minimum aggregation level is transmitted from a physical resource block (PRB) or a pair of PRBs, and
    wherein the distributed region is a region in which an e-PDCCH of the minimum aggregation level is transmitted from a plurality of PRBs or pairs of PRBs in distributed manner.

3. The method of claim 1,
    wherein the localized region is a region in which a part of e-PDCCH antenna ports is used among N number of e-PDCCH antenna ports given to an e-PDCCH aggregation region, and
    wherein the distributed region is a region in which the whole N number of e-PDCCH antenna ports are used.

4. The method of claim 1,
    wherein the localized region is a region in which a control channel element (CCE)/an enhanced CCE (e-CCE) is configured or mapped to a RB or a pair of RBs, and
    wherein the distributed region is a region in which the CCE/e-CCE is divided and configured or mapped to a plurality of RBs.

5. The method of claim 1,
    wherein the localized region is a region in which a search space of the e-PDCCH is configured or mapped to a continuous RB or a continuous pair of RBs, and
    wherein the distributed region is a region in which the search space of the e-PDCCH is configured or mapped to a distributed RB or a distributed pair of RBs.

6. The method of claim 1,
    wherein the localized region is a region to which e-PDCCHs of a plurality of UEs are allocated without being interleaved, and
    wherein the distributed region is a region to which e-PDCCHs of the plurality of UEs are allocated with being interleaved.

7. The method of claim 6, wherein the e-PDCCH of each of the plurality of UEs includes a plurality of units in the distributed region.

8. The method of claim 7, wherein each of the plurality of units is configured along with a frequency domain in a PRB, or configured along with a time domain and a frequency domain in a PRB.

9. The method of claim 1, wherein an aggregation level of the e-PDCCH which is allocated to the distributed region is higher than an aggregation level of an e-PDCCH which is allocated to the localized region.

10. The method of claim 1, wherein the scheduling assignment is transmitted through a common search space (CSS) of the e-PDCCH which is allocated to the distributed region.

11. The method of claim 10, wherein the scheduling assignment includes a common radio network temporary identity (RNTI).

12. The method of claim 10, wherein the scheduling assignment which is transmitted through the e-PDCCH allocated to the distributed region is a downlink control information (DCI) format 1A.

13. A base station for allocating a control channel in a wireless communication system, the base station comprising:
    a radio frequency (RF) unit for transmitting or receiving a radio signal; and
    a processor connected to the RF unit, and configured to:
        allocate an enhanced physical downlink control channel (e-PDCCH); and
        transmit a scheduling assignment through the allocated e-PDCCH,
        wherein the processor is configured to allocate the e-PDCCH by an allocation process that comprises:
            when an enhanced control channel element (CCE) aggregation level of a corresponding e-PDCCH format is below a predetermined value, allocating the e-PDCCH to a localized region which is contiguously configured in a frequency domain, or a distributed region which is dispersedly configured in the frequency domain; and when the e-CCE aggregation level is not below the predetermined value, allocating the e-PDCCH to only to the distributed region.

14. The method of claim 1, wherein the localized region is a region in which the e-PDCCH is allocated only to one physical resource block (PRB) or a PRB pair, wherein the distributed region is a region in which the e-PDCCH is allocated to multiple PRBs or multiple PRB pairs.

15. The base station of claim 13, wherein the localized region is a region in which the e-PDCCH is allocated only to one physical resource block (PRB) or a PRB pair, wherein the distributed region is a region in which the e-PDCCH is allocated to multiple PRBs or multiple PRB pairs.

* * * * *